(12) United States Patent
Eid et al.

(10) Patent No.: US 12,341,238 B2
(45) Date of Patent: Jun. 24, 2025

(54) TUNNEL DIODE-BASED BACKSCATTERING RFID SYSTEM

(71) Applicant: Georgia Tech Research Corporation, Atlanta, GA (US)

(72) Inventors: Aline Eid, Atlanta, GA (US); Jimmy Georges Donald Hester, Atlanta, GA (US); Emmanouil Tentzeris, Atlanta, GA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 442 days.

(21) Appl. No.: 17/908,639

(22) PCT Filed: Mar. 8, 2021

(86) PCT No.: PCT/US2021/021343
§ 371 (c)(1),
(2) Date: Sep. 1, 2022

(87) PCT Pub. No.: WO2021/236203
PCT Pub. Date: Nov. 25, 2021

(65) Prior Publication Data
US 2023/0093926 A1 Mar. 30, 2023

Related U.S. Application Data

(60) Provisional application No. 62/986,045, filed on Mar. 6, 2020.

(51) Int. Cl.
*H01Q 1/24* (2006.01)
*G06K 19/07* (2006.01)

(52) U.S. Cl.
CPC .......... *H01Q 1/248* (2013.01); *G06K 19/0723* (2013.01)

(58) Field of Classification Search
CPC .......................... H01Q 1/248; G06K 19/0723
See application file for complete search history.

(56) References Cited

U.S. PATENT DOCUMENTS 3,533,008 A    10/1970   Lee
5,598,169 A *   1/1997   Drabeck ................. G01S 13/75
                                                               343/702

(Continued)

FOREIGN PATENT DOCUMENTS

WO           0733914 A1     9/1996

OTHER PUBLICATIONS

Extended European Search Report from Application No. 21807655.2 dated May 27, 2024 (8 pages).

(Continued)

*Primary Examiner* — Seung H Lee
(74) *Attorney, Agent, or Firm* — Troutman Pepper Locke LLP; Ryan A. Schneider; Stephanie J. Remy

(57) ABSTRACT

An exemplary embodiment of the present disclosure provides a backscattering RFID system comprising: a combined oscillator and reflection amplifier circuit comprising a first tunnel diode having an anode and a cathode; and a biasing circuit in communication with the anode and configured to bias the first tunnel diode in a negative differential resistance region; wherein the combined oscillator and reflection amplifier circuit is configured to modulate a RF interrogation signal to produce a backscatter signal.

27 Claims, 7 Drawing Sheets

(56) References Cited

U.S. PATENT DOCUMENTS

| | | | |
|---|---|---|---|
| 7,847,644 B2 * | 12/2010 | Suzuki | G01S 7/4008 |
| | | | 331/177 V |
| 11,797,813 B1 * | 10/2023 | Ensworth | G06K 19/0723 |
| 2007/0194933 A1 | 8/2007 | Shanks et al. | |
| 2009/0114839 A1 | 5/2009 | Lechevalier | |
| 2009/0224895 A1 | 9/2009 | Ballard | |
| 2011/0279238 A1 | 11/2011 | Brommer et al. | |
| 2017/0271774 A1 | 9/2017 | Mukai et al. | |

OTHER PUBLICATIONS

International Search Report and Written Opinion from Application No. PCT/US2021/021343 dated Dec. 7, 2021 (11 pages).

* cited by examiner

TUNNEL DIODE-BASED BACKSCATTERING RFID SYSTEM

CROSS-REFERENCE TO RELATED APPLICATIONS

This application claims the benefit of U.S. Provisional Application Ser. No. 62/986,045, filed on Mar. 6, 2020, which is incorporated herein by reference in its entirety as if fully set forth below.

GOVERNMENT LICENSE RIGHTS

This disclosure was made with government support under Award No. FA9550-18-1-0191, awarded by the United States Air Force Office of Scientific Research. The government has certain rights in the disclosure.

FIELD OF THE DISCLOSURE

The various embodiments of the present disclosure relate generally to RFID electronics, and more particularly to tunnel diode-based backscattering RFID systems.

BACKGROUND

Backscatter front-ends are generally praised for their low power consumptions. However, this power consumption ends up being dwarfed by the associated modulating baseband circuitry. Furthermore, backscatter front-ends can be plagued by short reading ranges. Current backscattering communications systems used widely in RFID technology often lack the range offered by active alternatives. Many devices, such as Internet of Things devices, instead turn to active wireless architectures, such as Bluetooth Low Energy, to meet communication range requirements. These active systems require higher power consumption. Therefore, what is needed is a backscatter RFID system that has low power consumption and high reading ranges.

BRIEF SUMMARY

The present disclosure relates to a backscattering RFID system. An exemplary embodiment of the present disclosure provides a backscattering RFID system. The backscattering RFID system can comprise a combined oscillator and reflection amplifier circuit and a biasing circuit. The combined oscillator and reflection amplifier circuit can comprise a first tunnel diode. The first tunnel diode can have an anode and a cathode. The biasing circuit can be in communication with the anode. The biasing circuit can be configured to bias the first tunnel diode in a negative differential resistance region. The combined oscillator and reflection amplifier circuit can be configured to modulate a radio frequency (RF) interrogation signal to produce a backscatter signal.

In any of the embodiments disclosed herein, the backscattering RFID system can comprise an antenna. The antenna can be in communication with the anode of the first tunnel diode. The antenna can be configured to receive the RF interrogation signal and emit the backscatter signal.

In any of the embodiments disclosed herein, the combined oscillator and reflection amplifier circuit can comprise a resonance circuit. The resonance circuit can be in electrical communication with the cathode of the first tunnel diode.

In any of the embodiments disclosed herein, the resonance circuit can comprise an inductor and a capacitor.

In any of the embodiments disclosed herein, the combined oscillator and reflection amplifier circuit can comprise a matching circuit and a first RF isolator. The matching circuit and the first RF isolator can be arranged in parallel communication with the anode. The matching circuit can be arranged in series with the antenna. The first RF isolator can be arranged in series with the biasing circuit.

In any of the embodiments disclosed herein, the matching circuit can be a short shunt stub. The first RF isolator can be a radial stub.

In any of the embodiments disclosed herein, the biasing circuit can comprise a biasing source.

In any of the embodiments disclosed herein, the biasing source can be a power harvesting circuit.

In any of the embodiments disclosed herein, the power harvesting circuit can comprise a second tunnel diode. The second tunnel diode can have a second anode and a second cathode. The second tunnel diode can be arranged in a shunt configuration with the second anode in communication with a voltage divider.

In any of the embodiments disclosed herein, the power harvesting circuit can include a second matching network. The second matching network can be in communication with the second anode.

In any of the embodiments disclosed herein, the biasing circuit can comprise a voltage divider network. The voltage divider network can comprise at least one variable resistor.

In any of the embodiments disclosed herein, the at least one variable resistor can be a sensor.

In any of the embodiments disclosed herein, the backscattering RFID system can amplify an RF input power with a reflection amplification gain between 5 dB and 51 dB.

In any of the embodiments disclosed herein, the backscattering RFID system can operate with power consumption between 18 µW and 25 µW.

Another embodiment of the present disclosure provides a backscattering RFID system. The backscattering RFID system can comprise an oscillator circuit, a reflection amplifier circuit, and a biasing circuit. The oscillator circuit can comprise a first tunnel diode. The first tunnel diode can have a first anode and a first cathode. The reflection amplifier circuit can comprise a second tunnel diode. The second tunnel diode can have a second anode and a second cathode. The biasing circuit can communicate with one or more of the first anode and the second anode. The biasing circuit can be configured to bias the first tunnel diode in a negative differential resistance region.

In any of the embodiments disclosed herein, the backscattering RFID system can comprise an antenna. The antenna can be configured to receive an RF interrogation signal and emit a backscatter signal.

In any of the embodiments disclosed herein, the biasing circuit can comprise a biasing source.

In any of the embodiments disclosed herein, the biasing source can be a power harvesting circuit.

In any of the embodiments disclosed herein, the power harvesting circuit can comprise a third tunnel diode. The third tunnel diode can be characterized by a third anode and a third cathode. The third tunnel diode can be arranged in a shunt configuration with the third anode. The third tunnel diode can be in communication with a voltage divider.

In any of the embodiments disclosed herein, the power harvesting circuit can include a matching network. The matching network can be in communication with the third anode.

These and other aspects of the present disclosure are described in the Detailed Description below and the accompanying drawings. Other aspects and features of embodiments will become apparent to those of ordinary skill in the art upon reviewing the following description of specific, exemplary embodiments in concert with the drawings. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments discussed herein. Similarly, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

The following detailed description of specific embodiments of the disclosure will be better understood when read in conjunction with the appended drawings. To illustrate the disclosure, specific embodiments are shown in the drawings. It should be understood, however, that the disclosure is not limited to the precise arrangements and instrumentalities of the embodiments shown in the drawings.

DETAILED DESCRIPTION

To facilitate an understanding of the principles and features of the present disclosure, various illustrative embodiments are explained below. The components, steps, and materials described hereinafter as making up various elements of the embodiments disclosed herein are intended to be illustrative and not restrictive. Many suitable components, steps, and materials that would perform the same or similar functions as the components, steps, and materials described herein are intended to be embraced within the scope of the disclosure. Such other components, steps, and materials not described herein can include, but are not limited to, similar components or steps that are developed after development of the embodiments disclosed herein.

Figure 1:
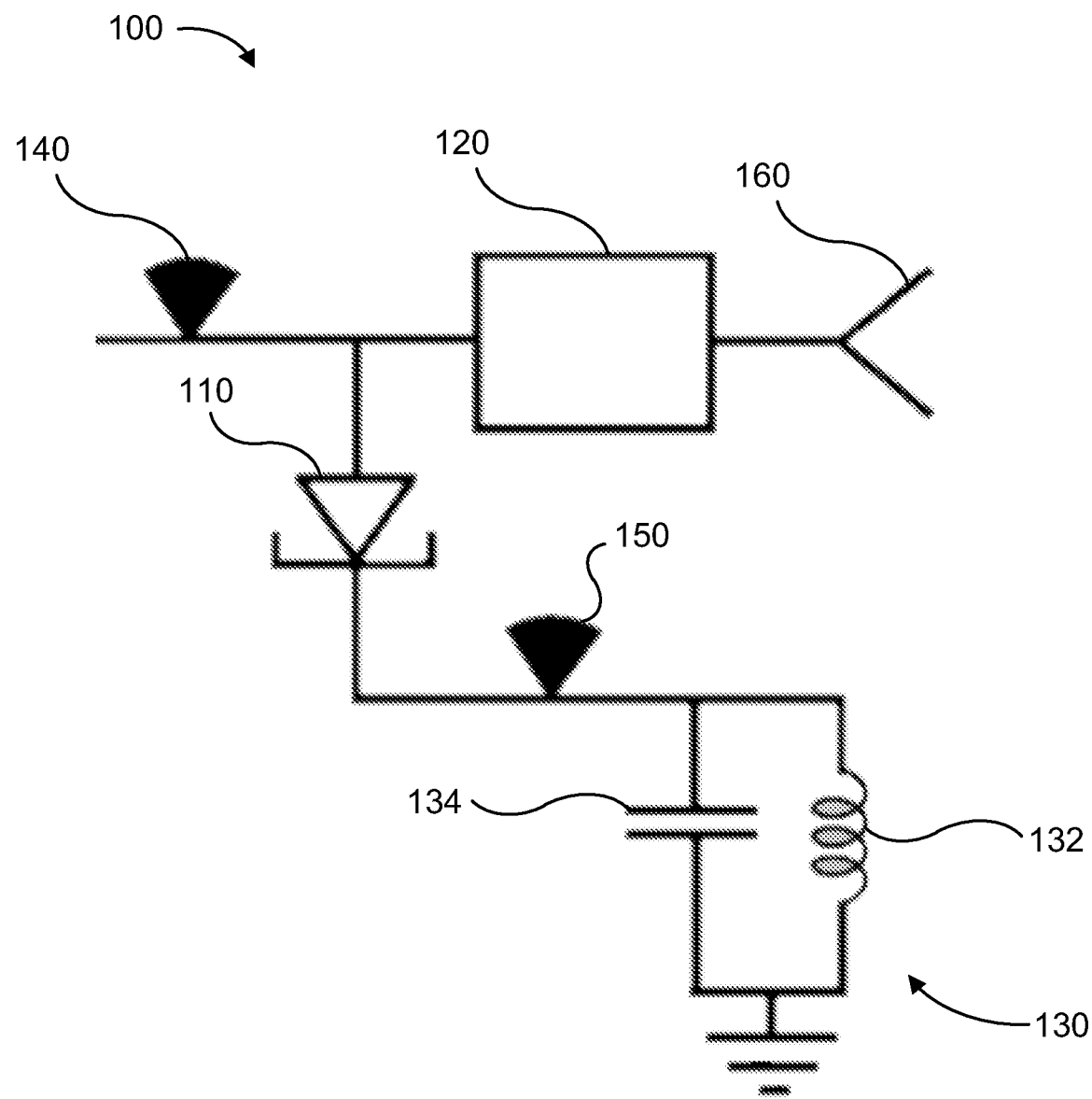
FIG. 1 is a circuit diagram of a combined oscillator and reflection amplifier, in accordance with an exemplary embodiment of the disclosed technology.

FIG. 1 illustrates an exemplary embodiment circuit diagram illustration of a passive backscatter system 100. The passive backscatter system 100 can include a first tunnel diode 110. The first tunnel diode 110 can include an anode and a cathode. The first tunnel diode 110 can be any tunnel diode known in the art. The passive backscatter system 100 can be combined oscillator and reflection amplifier.

The first tunnel diode 110 can be configured to function as a reflection amplifier. By way of example, the first tunnel diode 110 can be placed in shunt, followed by a matching circuit 120 and a first radial stub 140. Additionally, the matching circuit can be a short shunt stub for matching. Additionally, the first radial stub 140 may be for RF isolation. For example, the first radial stub 140 may be designed for 5.8 GHz RF isolation.

The first tunnel diode 110 can be configured to function as an oscillator. By way of example, the first tunnel diode 110 can be connected in series with a resonance circuit. The resonance circuit can be any resonance circuit known in the art, including, but not limited to a tank circuit, crystal, structural resonator, and the like, and any combination thereof. By way of example, the resonance circuit can be a tank circuit 130. The tank circuit 130 can include an inductor 132 and a capacitor 134.

Additionally, the passive backscatter system 100 can have an antenna 160. For example, the antenna 160 can be any antenna known in the art, including, but not limited to a monopole antenna, dipole antenna, loop antenna, horn antenna, patch antenna, and the like, and any combination thereof. In certain implementations, the antenna 160 can be configured to receive the RF interrogation signal and emit the backscatter signal.

The passive backscatter system 100 can be configured to communicate with a biasing source. By way of example, the biasing source can be any biasing source known in the art, including, but not limited to a rectenna system, power harvesting circuit, solar circuit, battery, and the like, and any combination thereof. Additionally, the biasing source can be configured to bias the first tunnel diode 110 in a negative differential resistance region. For example, the first tunnel diode 110 can be biased in a negative differential region using a first biasing power such that the first tunnel diode 110 can operate as an oscillator. For example, the first tunnel diode 110 can be biased in a negative differential region using a second biasing power such that the first tunnel diode 110 can operate as a reflection amplifier. Additionally, the first tunnel diode can be biased into a negative differential region to operate as both an oscillator and reflection amplifier without requiring any additional biasing power more than either the first or second biasing power.

Figure 2:
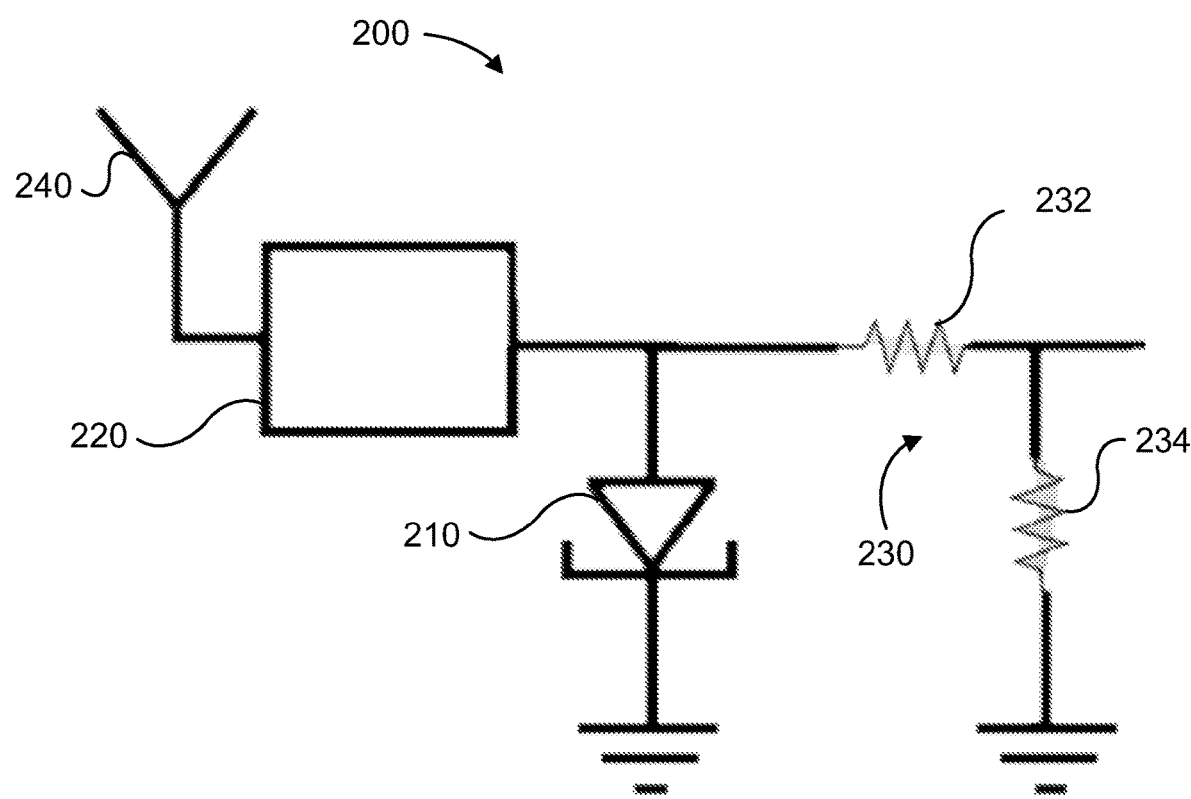
FIG. 2 is a diagram illustrating a power harvesting circuit, in accordance with an exemplary embodiment of the disclosed technology.

As shown in FIG. 2, an exemplary embodiment of the present disclosure provides a circuit diagram of a rectenna system 200. The rectenna system 200 can include a second tunnel diode 210. The second tunnel diode 210 can include an anode and a cathode. The second tunnel diode 210 can be any tunnel diode known in the art. The rectenna system 200 can be a power harvesting circuit.

The second tunnel diode 210 can be used as a rectifier. The second tunnel diode 210 can be placed in shunt, preceded by a matching network 220 and followed by an RF choke. By way of example, the matching network 220 can be a meandering-lines-based matching network for miniaturization. Additionally, the matching network can be any matching network known in the art.

The tunnel-diode-based rectifier can have a rectifying saturation voltage corresponding to the IV curve of the second tunnel diode 210 that is the same or similar to a desired system biasing voltage. For example, the tunnel-diode-based rectifier can have a low saturation voltage. By way of example, the saturation voltage can be around 0.2V (add ranges). Additionally, the tunnel-diode-based rectifier can be independent of large changes in load values. The self-regulating feature of the tunnel-diode-based rectifier can keep the system within its intended operating range while minimizing the amount of power wasted in dc-dc conversion.

Additionally, the rectenna system 200 can have an antenna 240. For example, the antenna 240 can be any antenna known in the art, including, but not limited to a monopole antenna, a dipole antenna, loop antenna, horn antenna, patch antenna, and the like, and any combination thereof. The antenna 240 can be a harvesting receiving antenna that will channel the RF power to the tunnel diode-based rectifier.

Additionally, the rectenna system 200 can be a biasing source. For example, the rectenna system 200 can be configured to be a biasing source for a tunnel-diode-based passive backscatter system. By way of example, rectenna system 200 can be configured to act as a biasing source for a passive backscatter system 100. The biasing source can be configured to bias the first tunnel diode 110 in a negative differential resistance region. For example, the first tunnel diode 110 can be biased in a negative differential region using a first biasing power such that the first tunnel diode 110 can operate as an oscillator. For example, the first tunnel diode 110 can be biased in a negative differential region using a second biasing power such that the first tunnel diode 110 can operate as a reflection amplifier. Additionally, the first tunnel diode can be biased into a negative differential region to operate as both an oscillator and reflection amplifier without requiring any additional biasing power more than either the first or second biasing power.

Figure 3:
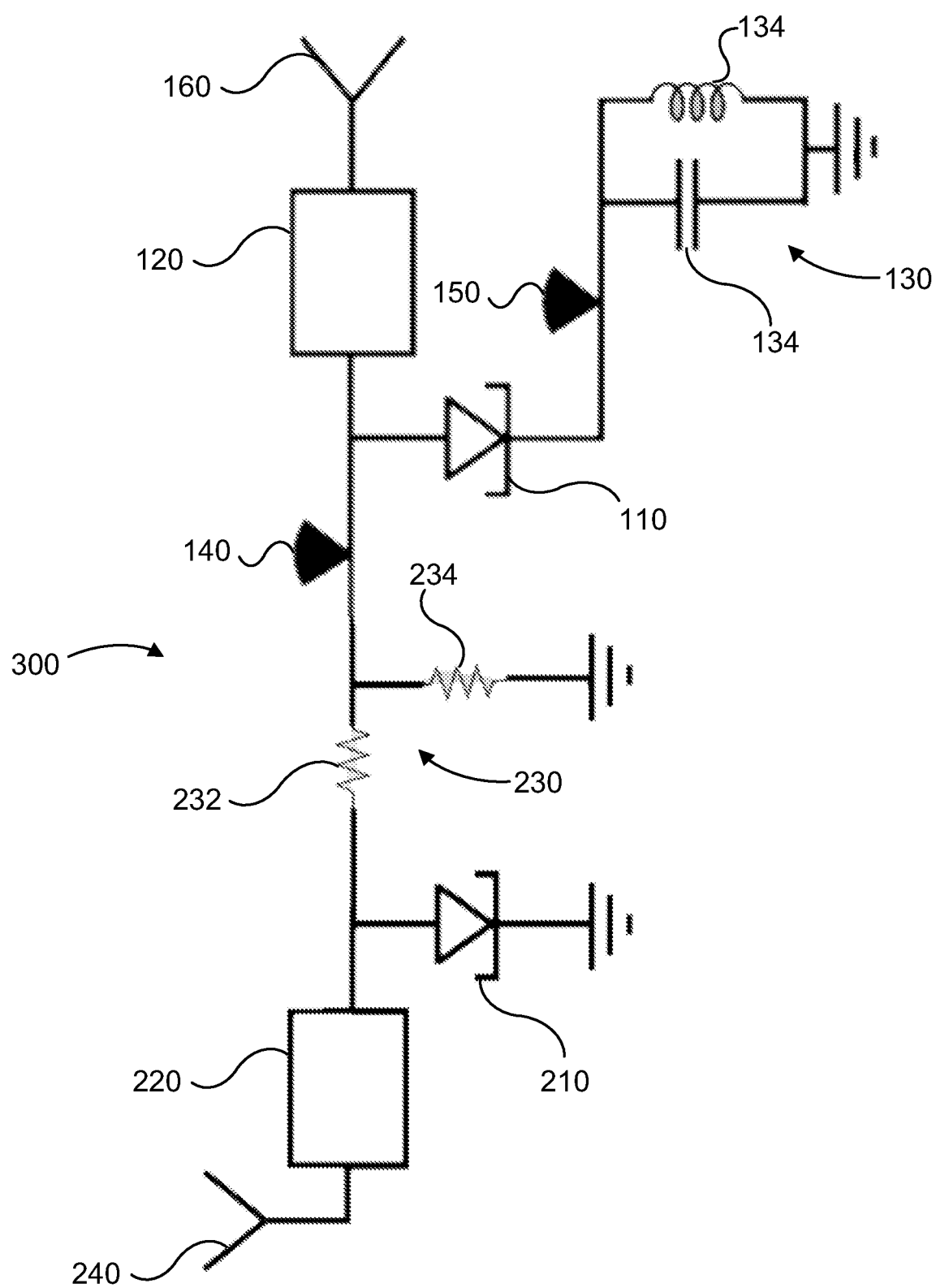
FIG. 3 is a circuit diagram of an RFID backscatter circuit, in accordance with an exemplary embodiment of the disclosed technology.

As shown in FIG. 3, an exemplary embodiment of the present disclosure provides a circuit diagram of an RFID backscatter circuit. Additionally, as shown in FIG. 3, an exemplary embodiment of the present disclosure provides a circuit diagram of a fully-tunnel-diode-based backscattering RFID system 300. The fully-tunnel-diode-based backscattering RFID system 300 can be a fully passive backscattering RFID tag. The fully-tunnel-diode-based backscattering RFID system 300 can include a passive backscatter system 100. Additionally, the fully-tunnel-diode-based backscattering RFID system 300 can include a rectenna system 200.

The passive backscatter system 100 can include a first tunnel diode 110. The first tunnel diode 110 can include an anode and a cathode. The first tunnel diode 110 can be any tunnel diode known in the art. The first tunnel diode 110 can be configured to function as a reflection amplifier. By way of example, the first tunnel diode 110 can be placed in shunt, followed by a matching circuit 120 and a first radial stub 140. Additionally, the matching circuit can be a short shunt stub for matching. Additionally, the first radial stub 140 may be for RF isolation. For example, the first radial stub 140 may be designed for 5.8 GHz RF isolation. The first tunnel diode 110 can be configured to function as an oscillator. By way of example, the first tunnel diode 110 can be connected in series with a resonance circuit. The resonance circuit can be any resonance circuit known in the art, including, but not limited to a tank circuit, crystal, structural resonator, and the like, and any combination thereof. By way of example, the resonance circuit can be a tank circuit 130. The tank circuit 130 can include an inductor 132 and a capacitor 134. Additionally, the passive backscatter system 100 can have an antenna 160. For example, the antenna 160 can be any antenna known in the art, including, but not limited to a monopole antenna, dipole antenna, loop antenna, horn antenna, patch antenna, and the like, and any combination thereof. In certain implementations, the antenna 160 can be configured to receive the RF interrogation signal and emit the backscatter signal.

The rectenna system 200 can include a second tunnel diode 210. The second tunnel diode 210 can include an anode and a cathode. The second tunnel diode 210 can be any tunnel diode known in the art. The second tunnel diode 210 can be used as a rectifier. The second tunnel diode 210 can be placed in shunt, preceded by a matching network 220 and followed by an RF choke. By way of example, the matching network 220 can be a meandering-lines-based matching network for miniaturization. Additionally, the matching network can be any matching network known in the art. The tunnel-diode-based rectifier can have a rectifying saturation voltage corresponding to the IV curve of the second tunnel diode 210 that is the same or similar to the desired system biasing voltage. For example, the tunnel-diode-based rectifier can have a low saturation voltage. By way of example, the saturation voltage can be around 0.2V. Additionally, the tunnel-diode-based rectifier can be independent of large changes in load values. The self-regulating feature of the tunnel-diode-based rectifier can keep the system within its intended operating range, while minimizing the amount of power wasted in dc-dc conversion. Additionally, the rectenna system 200 can have an antenna 240. For example, the antenna 240 can be any antenna known in the art, including, but not limited to a monopole antenna, dipole antenna, loop antenna, horn antenna, patch antenna, and the like, and any combination thereof. The antenna 240 can be a harvesting receiving antenna that will channel the RF power to the tunnel diode-based rectifier.

Additionally, the rectenna system 200 can be a biasing source for the passive backscatter system 100. The biasing source can be configured to bias the first tunnel diode 110 in a negative differential resistance region. For example, the first tunnel diode 110 can be biased in a negative differential region using a first biasing power such that the first tunnel diode 110 can operate as an oscillator. For example, the first tunnel diode 110 can be biased in a negative differential region using a second biasing power such that the first tunnel diode 110 can operate as a reflection amplifier. Additionally, the first tunnel diode can be biased into a negative differential region to operate as both an oscillator and reflection amplifier without requiring any additional biasing power more than either the first or second biasing power.

The following examples further illustrate aspects of the present disclosure. However, they are in no way a limitation of the teachings or disclosure of the present disclosure as set forth herein.

Examples

Internet of Things (IoT) devices currently employs active wireless architectures, whose power consumption levels exceed 5 mW (typical Bluetooth Low Energy (BLE) during emission) and, therefore, are required to put themselves under heavy duty-cycling regimes. Backscatter communications, ubiquitous in the RFID world, offer single-digit-μW-operating alternative but have paled in comparison to the range offered by active alternatives. This work adds its contribution to a middle-range solution—amplified backscatter—which provides a middle ground between the two aforementioned approaches.

The magnitude of the signal generated by a backscatter modulator is proportional to the modulation factor M defined in Equation 1 which, for passive front-ends, is typically smaller than 1.

$$M = \tfrac{1}{4}|\Gamma_1 - \Gamma_2|^2 \qquad \text{Equation 1:}$$

where $\Gamma_1$ and $\Gamma_2$ are the reflection coefficients at the two extreme states of modulation. With active front-ends comes the ability to create reflection coefficients greater than unity and to, therefore, significantly increase M. This can be achieved using electronic devices that display a negative resistance, and can thus operate as reflection amplifiers under specific biasing conditions. Recent work has demonstrated the implementation of tunnel diodes to achieve the advantageous combination of sub-mW power consumption and reflection gains above 40 dB. A tunnel diode's behavior is governed by the quantum tunneling effect that results in a unique IV curve that offers a wide range of functions depending on the region where it is being operated. At zero-bias, the diode can be used for harvesting applications. In the negative differential resistance region, the diode can be used as an oscillator or a reflection amplifier. For large biases, the tunnel diode behaves like a Schottky diode and can be implemented in mixer applications. Backscatter systems require the use of a sub-carrier-generating oscillator operating at a frequency high enough to isolate the backscatter signal from the phase-noise-generated reader self-interference (TX to RX). To reach subcarriers above several MHz, several hundred microwatts of power and dedicated components can be currently required.

In some embodiments disclosed herein, and for the first time, three major functions of a tunnel diode can be combined together to form a self-sufficient, extremely low-voltage and low power-consumption RFID backscattering system operating within the 5.8 GHz ISM band, as presented in the schematic of FIG. 3. FIG. 3 shows a schematic of the fully-tunnel-diode-based passive backscatter tag. A self-regulating tunnel diode-based rectifier—that can operate within a radius of more than 3 m around a 36 dBm EIRP power source—harvests power at 900 MHz to bias a tunnel diode-based combined oscillator/reflection amplifier system that enables return gains up to 48 dB while consuming power as low as 20 μW. This system relies only on two tunnel diodes and few passive components to achieve all the requirements for an energy-autonomous RFID tag.

5.8 GHz Tunnel-Diode Basic RFID Tag Elements
A. Tunnel Diode as an Oscillator

Figure 4:
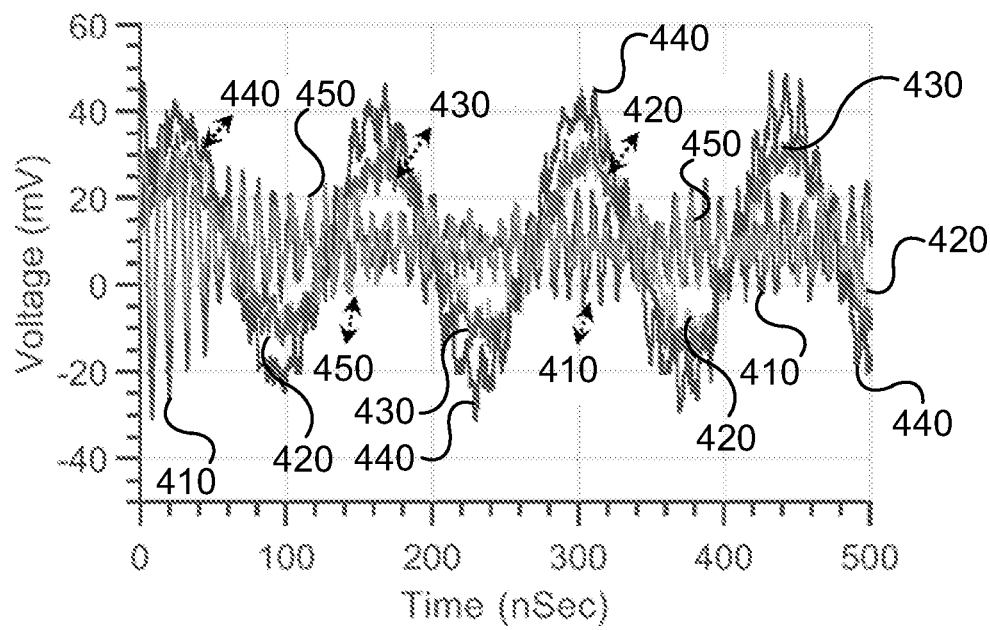
FIG. 4 shows experimentally-measured oscillation signals at different bias voltages, in accordance with an exemplary embodiment of the disclosed technology.

Tunnel diodes can be very promising devices for oscillator circuits up to mm-wave frequencies because they are not limited by transit-time effects. When connected to a simple LC circuit and biased with a voltage that brings its current into the negative resistance region, the resistance losses of the LC circuit could be compensated for by the negative resistance generated by the diode: which can be a condition for stable oscillations. Compared to the low power oscillators available in the market, such as the CSS555 micropower timer or the micropower oscillators from SiTime, the tunnel diode offers both lower power consumption—with, notably, a biasing voltage down to 70 mV relative to the 1.2 V of the aforementioned components—and higher oscillation frequencies above 10 GHz. Finally—as described below—if a diode is used in this mode, it can double as a reflection amplifier without requiring any more biasing power. An embodiment disclosed below, the MBD2057-E28X tunnel diode from Aeroflex was connected in series with an LC tank composed of a 0.5 μH inductor with an internal resistance of 31 mΩ and a 1 nF capacitor, that would result in a resonance frequency around 7 MHz. The diode was designed and simulated using Keysight Advanced Design System (ADS), by implementing the nonlinear model of the diode extracted from its IV curve. For an operation within the negative differential resistance region, a voltage ranging between 70 mV and 180 mV is required across the diode. An external voltage source of 0.2 V was used for this test, accompanied with a set of two resistors for voltage division, to set the proper biasing for the diode and proper current level for the tank circuit. FIG. 4 presents the result of the test of the tunnel diode-based oscillator circuit for different biasing conditions. FIG. 4 shows measured oscillation for the tunnel diode-based oscillator for different biasing: 65 mV (410), 72 mV (420), 80 mV (430), 88 mV (440), and 98 mV (450). The power consumption on the diode was measured to be 19 μW. It can be seen that the MBD2057 is highly sensitive to the applied voltage and oscillations at the desired frequency occur only for a biasing between 70 mV and 92 mV.

B. Tunnel Diode as a Reflection Amplifier

Figure 5:
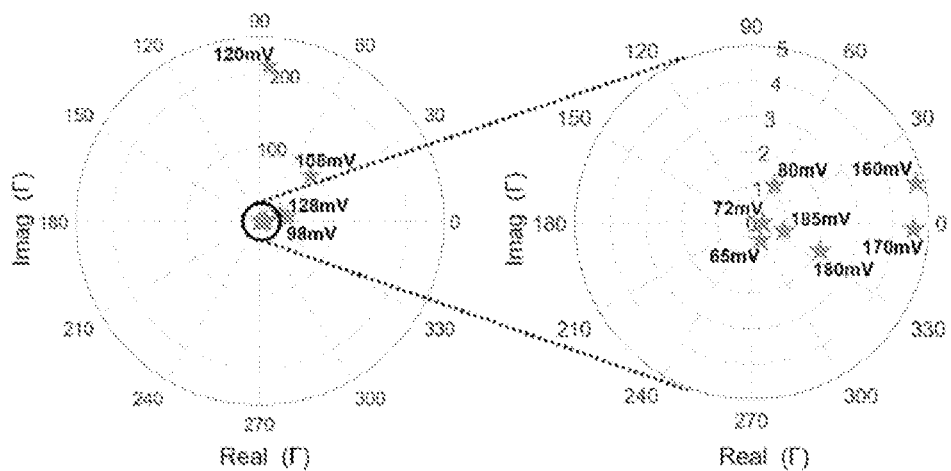
FIG. 5 shows experimentally-measured reflection coefficients, in accordance with an exemplary embodiment of the disclosed technology. The chart on the right is an expanded version of the small central portion of the chart on the left.

The negative resistance resulting in a modulation factor M>1 displayed by the tunnel diode is desirable to extend the range achieved by backscatter modulation systems. This subsection presents the design, fabrication, and testing of the 5.8 GHz MBD2057-based reflection amplifier. The circuit was printed on copper-clad Rogers RO4003C substrate ($\varepsilon r = 3.55$ and $h = 0.508$ mm) using an inkjet-printed masking technique followed by etching. Similar to the tunnel diode-based oscillator circuit presented above, the reflection amplifier was first characterized with respect to the applied biasing voltages. The changes in the amplitude and phase of the reflection coefficients $\Gamma$ were measured and presented in FIG. 5 for an input power of −75 dBm and a frequency of 5.8 GHz. The left side of FIG. 5 contains all the tests results where the biasing voltage was swept over the entire negative resistance region, with amplitudes of $\Gamma$ exceeding 200. The right side of FIG. 5 focuses on the region inside the black circle that contains data for reflection coefficients up to an amplitude of 5. The reflection amplifier is then capable of producing reflection coefficients oscillating between −10 dB and 48 dB, thereby yielding a modulation factor M=11000. The reflection amplifier is also less sensitive to the changes in biasing voltages compared to the oscillator circuit.

Figure 6:
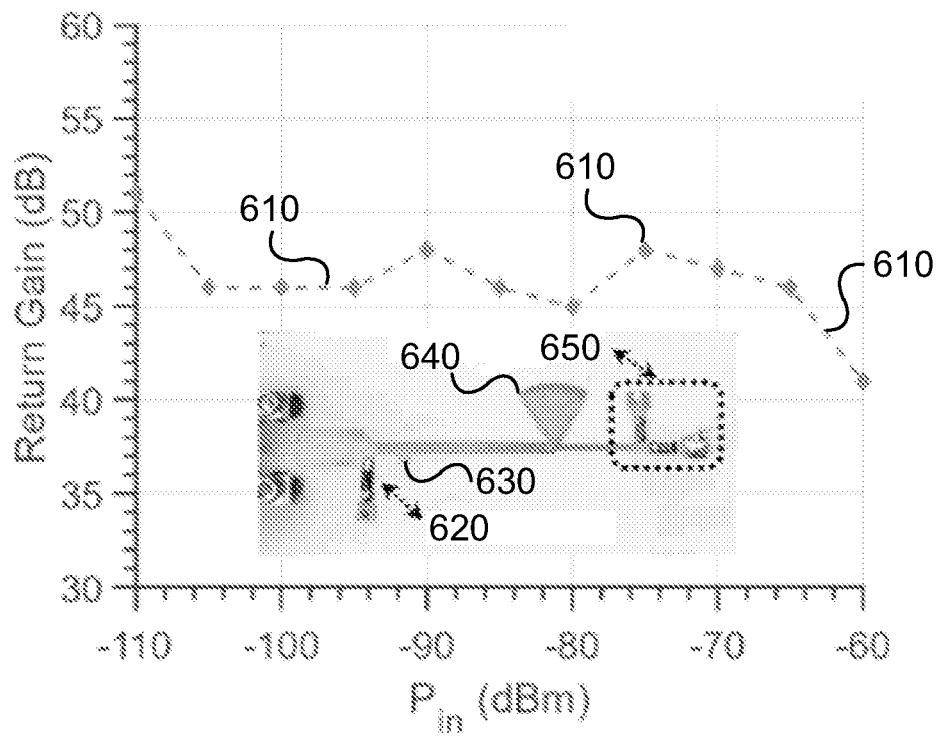
FIG. 6 is a graph of experimentally-measured return gains and an inset photo of the associated circuit, in accordance with an exemplary embodiment of the disclosed technology.

The return gains of the MBD2057-based reflection amplifier were also characterized with respect to changes in RF input powers under the optimal biasing voltage of 120 mV. FIG. 6 shows the measured gains for the reflection amplifier with respect to RF input powers for a biasing voltage of 120 mV and a frequency of 5.8 GHz (shown as line 610). FIG. 6 presents the excellent behavior of the reflection amplifier, reflecting a gain as high as 51 dB for an extremely low input power of −110 dBm. The photo of the fabricated MBD-based reflection amplifier is also presented in FIG. 6. The circuit is composed of the tunnel diode 620 placed in shunt, followed by a short shunt stub 630 for matching and a radial stub 640 for RF isolation. Similar to the previous test with the oscillator, the biasing circuit relied on an external voltage source 650 of 0.2 V and two variable resistors to enable a tunable biasing voltage on the diode. The power consumption on the diode was measured to be 18 µW.

C. Tunnel Diode as a Rectifier

Figure 7:
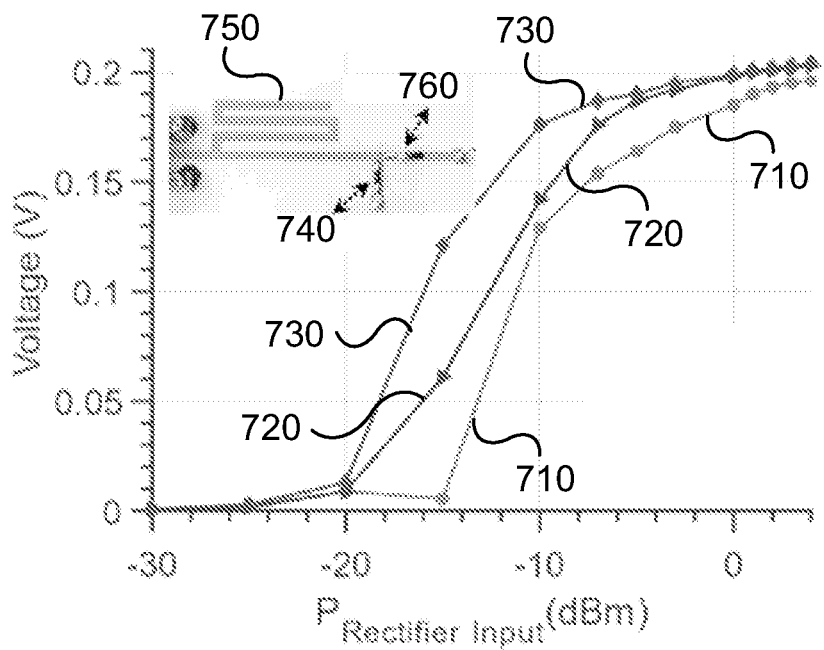
FIG. 7 is a graph of experimentally-measured output voltages and an inset photo of the associated circuit, in accordance with an exemplary embodiment of the disclosed technology.

The previous experiments demonstrating the capabilities of the tunnel diode to operate as an oscillator and a reflection amplifier highlighted the importance of a strictly-controlled biasing voltage. Here, the behavior of the tunnel diode as a rectifier and its suitability as a power source for this system is described. This was motivated by the fact that its IV curve suggests a rectifying saturation voltage close to that needed to bias this system. As mentioned above, the tunnel diode can be used for harvesting applications when zero-biased. FIG. 7 shows the measured output voltages for the tunnel-diode-based rectifier versus RF input powers for different load conditions: $R_L$=500Ω (710); $R_L$=1KΩ (720); and $R_L$=1MΩ (730). The circuit presented in FIG. 7 shows the fabricated rectifier using a tunnel diode 740 connected in a shunt configuration, preceded by a meandered-lines-based matching network 750 for miniaturization purposes, and followed by an RF choke 760. The rectifier is designed at 900 MHz, where up to 36 dBm EIRP is allowed. The output voltage plotted with respect to the RF input power for different load values shows that the tunnel diode is the perfect power source for the system. The reason behind this perfect match is that the tunnel diode-based rectifier saturates at a low voltage level, around 0.2 V. Furthermore, it is interestingly remarkably independent of large changes in load values. These characteristics are very different in typical Schottky diodes, a very common choice for harvesting applications, where the diode saturates at much higher voltage levels when it reaches breakdown, in addition to the diode being very sensitive to load changes. The tunnel diode-based rectifier is very suitable for the application presented in this work, where its self-regulating feature above a certain power level will keep the system within its intended operating range while minimizing the amount of power wasted in dc-dc conversion.

Fully-Tunnel-Diodes-Based Passive Backscatter System

A. Single Tunnel Diode with Dual Functions

Figure 8:
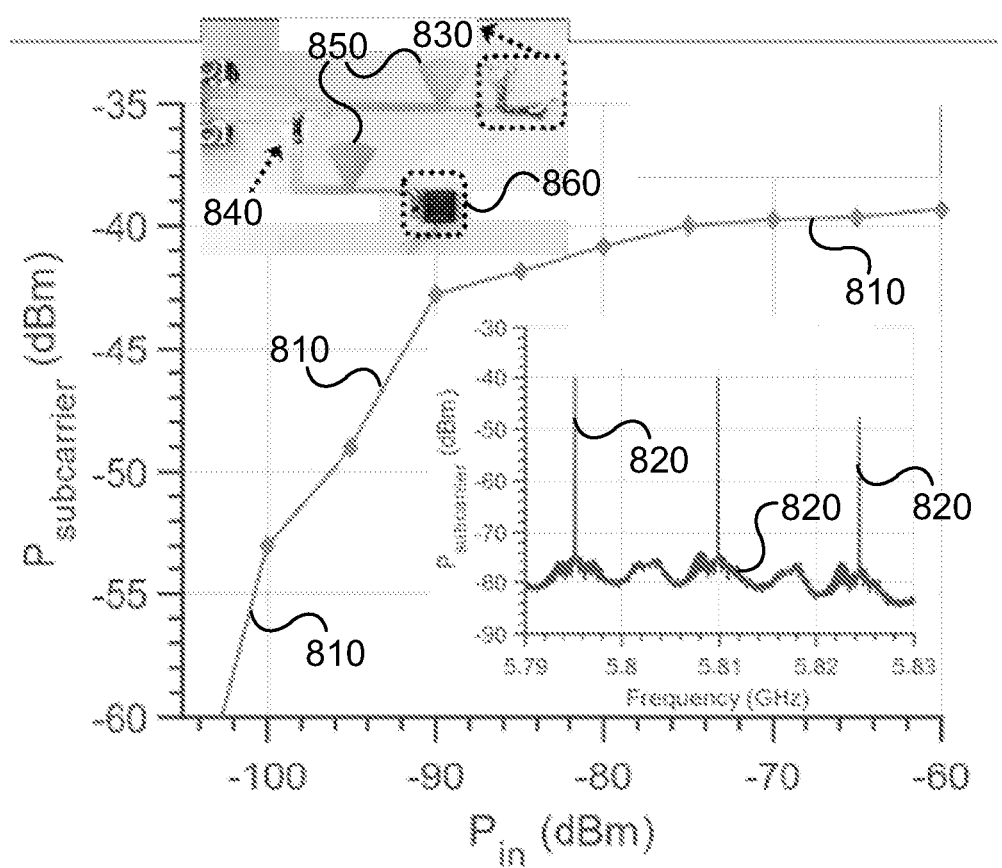
FIG. 8 is a graph of experimentally-measured sub-carrier powers, an inset photo of the associated circuit diagram, and an inset graph of the sub-carrier frequency spectrum, in accordance with an exemplary embodiment of the disclosed technology.

The ability of the tunnel diode in executing separate jobs is discussed above. Instead of using two separate diodes to achieve an amplified modulated signal, we now describe combining the two functionalities presented above in a single diode following the system presented in FIG. 8. FIG. 8 shows a fabricated combined oscillator/reflection amplifier system on RO4003C with the measured sub-carrier powers over a range of RF input powers at a biasing voltage point of 88 mV (shown as line 810). In addition, FIG. 8 displays the modulated and amplified RF signal for $P_{in}$=−75 dBm and biasing voltage=88 mV (shown as line 820). Using a single biasing source 830 and a single diode 840 and by properly placing radial stubs 850 for RF isolation between the tunnel diode and the DC power source from one side and the 7 MHz oscillation on the other, this system can achieve a dual functionality while not consuming additional power. To test the behavior of this system, a common biasing voltage point was chosen; more specifically, a choice obeying the high sensitivity of the tunnel diode-based-oscillator observed above. For this purpose, 88 mV was used to bias the diode at a frequency of 5.8 GHz, while the reflected subcarrier power was measured for an input power ranging from −105 dBm to −60 dBm. The results prove the successful implementation of the dual functionalities through the use of a single diode with a single bias, with a resulting gain ranging between 21 dB and 48 dB. Added on top of this plot is a measurement extracted from the spectrum analyzer, showing the amplified modulated signals at the designed oscillating frequency of 7 MHz surrounding the carrier signal for an input power of −75 dBm. The power consumption on the diode was measured to be 20 µW.

As explained above, the experimental setup utilized a 5.8 GHz RF wireless signal for interrogation, but as will be discussed below, the disclosed technology is not limited to 5.8 GHz. In certain implementations, the interrogation signal may enter the RFID system through the antenna and is amplified and reflected by the amplifier. As experimentally verified, the amplification gain changes at a modulation rate of 7 MHz (due to the oscillation of the tunnel diode and LC tank circuit 860), thereby modulating the reflected RF signal to create a modulated re-emission at 5.8 GHz±7 MHz.

In certain exemplary implementations, the modulation frequency can be changed by shifting the resonance of the LC tank (or other resonator used, including a sensor) or, slightly, by changing the biasing of the tunnel diode. This can occur at frequencies ranging from 10 Hz to (at least) 6 GHz. The RF signal frequency may range from 100 KHz to, at least, 2 THz. Certain implementations and choices of frequencies may depend on the use case. According to an exemplary implementation of the disclosed technology, the modulation frequency can be changed from one tag to the other for differentiation.

B. Tunnel-Diode-Powered System

Figure 9A:
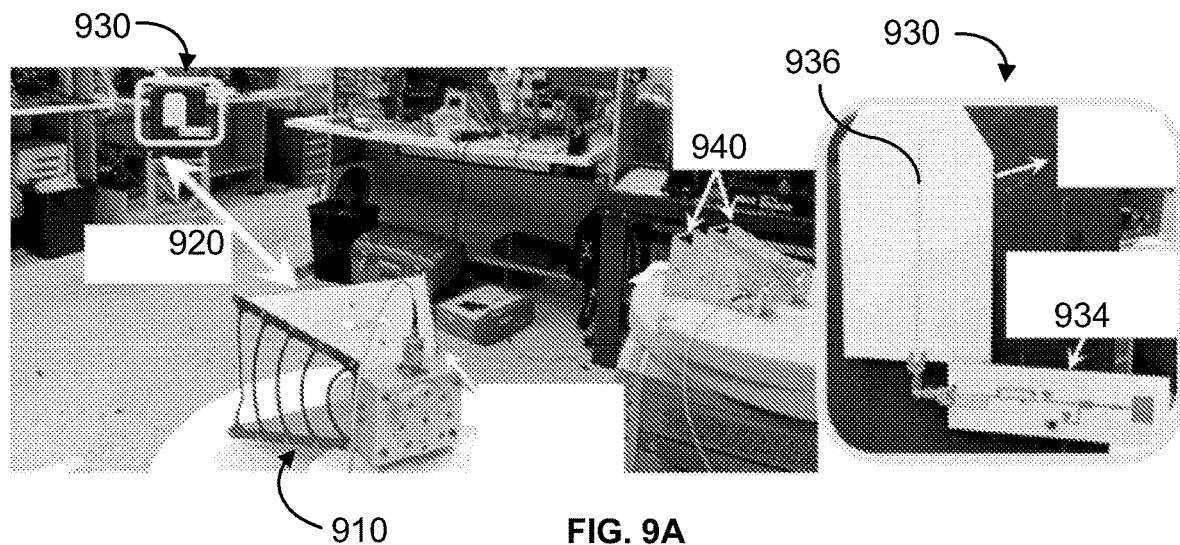
FIG. 9A are photos of a backscattering RFID device (right) and an associated system (left), in accordance with an exemplary embodiment of the disclosed technology.
Figure 9B:
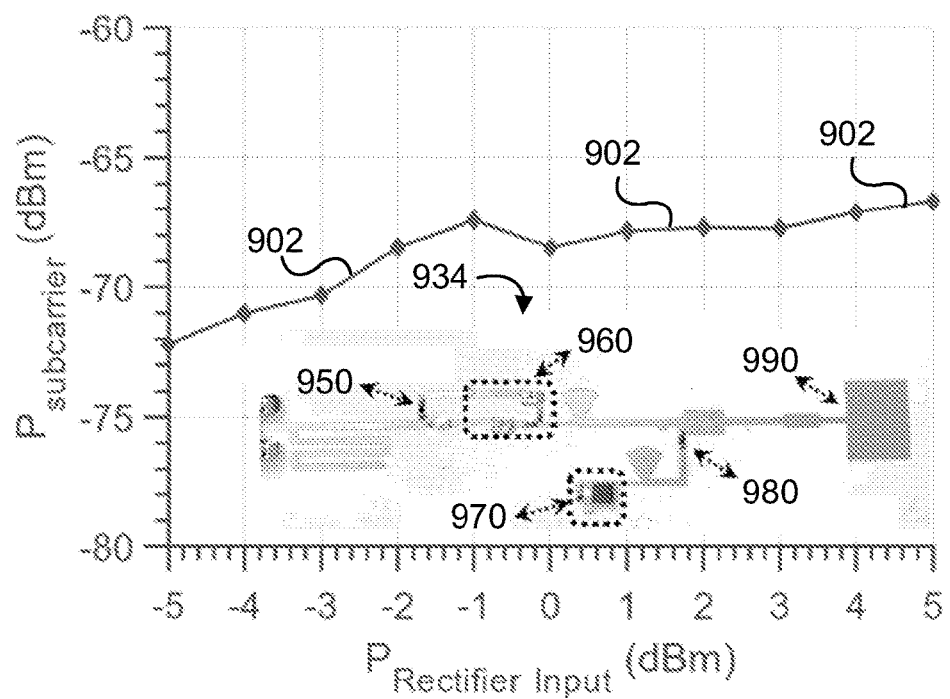
FIG. 9B is a graph of experimentally-measured sub-carrier powers and an inset photo of the associated power harvesting and reflection amplifier circuit, in accordance with an exemplary embodiment of the disclosed technology.

The third capability described above was then added to the system using a separate diode to provide the proper biasing to the combined oscillator/reflection amplifier system presented above. In order to test the behavior of the system in a wireless environment, a monopole antenna was designed at 900 MHz to act as the harvesting receiving antenna that will channel the RF power to the tunnel diode-based rectifier. The size of the antenna can be reduced by more than 50% by applying miniaturization techniques such as meandered lines or meta-material loading, however a simple monopole was used for validation purposes only. On the backscatter front-end side, a patch antenna was designed at 5.8 GHz to act as the receiver element in the designed tag. Both antennas were cross-polarized to avoid mixing products. FIG. 9A shows the experimental setup used to test the variation in the output powers of the sub-carrier with respect to changes in the distance between the 900 MHz energy harvesting source and the tag, which translates to changes in the RF power at the input of the rectifier. A horn antenna 910 transmitting 36 dBm EIRP at 900 MHz was placed a distance 920 of 3 m away from the tag 930, presented in detail in FIG. 9A to the right. Two horn antennas 940, acting as the TX and RX for the backscatter communications at 5.8 GHz, were placed at the same distance 920 away from the tag 930. Since the tunnel diode-based rectifier is self-regulating and saturates at a voltage of around 0.2 V with a slight dependence on the load attached to it, it offers a high level of freedom and flexibility with regards to the location of the tag. This hypothesis is validated in the plot shown in FIG. 9B. FIG. 9B shows the measured sub-carrier powers over a range of RF powers at the input of the rectifier (shown as line 902) in addition to a photo of the fabricated dual tunnel diodes system 934. The fabricated tunnel diode system can include a tunnel diode-based rectifier 950, a voltage division 960, a LC tank 970, tunnel diode-based oscillator and reflection amplifier 980 and a 5.8 GHz patch antenna 990. The system starts oscillating and amplifying when the RF power at the input of the rectifier is around −5 dBm, corresponding to a distance of 4 m away from the source, under 36 dBm EIRP, considering a transmitter antenna gain of 5 dB and a receiver antenna gain of 2 dB. The operation of the system remains relatively stable as seen in FIG. 9B, with the increase of the power at the input of the rectifier, due to the unique self-regulating feature of the tunnel diode-based rectifier. A 10 dBm increase in the input power did not derail the biasing applied on the tunnel diode-based combined oscillator/reflection amplifier, even with a limited working oscillator voltage range of 70 mV to 92 mV. This experiment entails that in addition to the tunnel diode being able to power the voltage-sensitive tag, it is also providing movement freedom over a wide range of more than 3 m in which the source or receiver could be moved while the system is still able to send amplified modulated signals.

It is to be understood that the embodiments and claims disclosed herein are not limited in their application to the details of construction and arrangement of the components outlined in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application nor is it intended to be limiting to the scope of the claims in any way.

What is claimed is:

1. A backscattering system comprising:
    a first tunnel diode having an anode and a cathode; and
    a biasing source configured to bias the first tunnel diode in a negative differential resistance region;
    wherein the first tunnel diode is configured to:
        modulate an interrogation signal to produce a backscatter signal; and
        operate simultaneously as an oscillator and a reflection amplifier.

2. The backscattering system of claim 1 further comprising:
    a combined oscillator and reflection amplifier circuit; and
    an antenna in communication with the anode of the first tunnel diode;
    wherein the combined oscillator and reflection amplifier circuit comprises:
        the first tunnel diode; and
        a resonance circuit in electrical communication with the cathode of the first tunnel diode.

3. A backscattering system comprising:
    a first tunnel diode having an anode and a cathode;
    a biasing source configured to bias the first tunnel diode in a negative differential resistance region;
    a combined oscillator and reflection amplifier circuit; and
    an antenna in communication with the anode of the first tunnel diode;
    wherein the combined oscillator and reflection amplifier circuit comprises:
        the first tunnel diode; and
        a resonance circuit in electrical communication with the cathode of the first tunnel diode.

4. The backscattering system of claim 3, wherein the combined oscillator and reflection amplifier circuit further comprises:
    a matching circuit; and
    a first RF isolator arranged in parallel communication with the anode of the first tunnel diode;
    wherein the matching circuit is arranged in series with the antenna; and
    wherein the first RF isolator is arranged in series with the biasing source.

5. The backscattering system of claim 3, wherein:
    the biasing source comprises a biasing circuit in communication with the anode of the first tunnel diode;
    the combined oscillator and reflection amplifier circuit is configured to modulate a RF interrogation signal to produce the backscatter signal; and
    the antenna is configured to:
        receive the RF interrogation signal; and
        emit the backscatter signal.

6. A backscattering system comprising:
    a first tunnel diode having an anode and a cathode; and
    a biasing source configured to bias the first tunnel diode in a negative differential resistance region;
    wherein the first tunnel diode is configured to:
        modulate an interrogation signal to produce a backscatter signal; and
        operate as a reflection amplifier.

7. The backscattering system of claim 6, wherein the system is configured to:
    amplify an RF input power with a reflection amplification gain of between 5 dB and 51 dB; and
    operate with a power consumption of between 18 µW and 25 µW.

8. A backscattering RFID system comprising:
    a combined oscillator and reflection amplifier circuit comprising a first tunnel diode having an anode and a cathode; and
    a biasing circuit in communication with the anode and configured to bias the first tunnel diode in a negative differential resistance region;
    wherein the combined oscillator and reflection amplifier circuit is configured to modulate an RF interrogation signal to produce a backscatter signal.

9. The backscattering RFID system of claim 8, wherein the biasing circuit comprises a biasing source.

10. The backscattering RFID system of claim 9, wherein the biasing source is a power harvesting circuit.

11. The backscattering RFID system of claim 10, wherein the power harvesting circuit comprises a second tunnel diode having a second anode and a second cathode; and
    wherein the second tunnel diode is arranged in a shunt configuration with the second anode in communication with a voltage divider.

12. The backscattering RFID system of claim 11, wherein the power harvesting circuit further comprises a matching network in communication with the second anode.

13. The backscattering RFID system of claim 8, wherein the biasing circuit comprises a voltage divider network; and
    wherein the voltage divider network comprises at least one variable resistor.

14. The backscattering RFID system of claim 13, wherein at least one variable resistor is a sensor.

15. The backscattering RFID system of claim 8, wherein the backscattering RFID system is configured to amplify an RF input power with a reflection amplification gain of between 5 dB and 51 dB.

16. The backscattering RFID system of claim 8, wherein the backscattering RFID system is configured to operate with a power consumption of between 18 µW and 25 µW.

17. The backscattering RFID system of claim 8 further comprising an antenna in communication with the anode of the first tunnel diode and configured to:
   receive the RF interrogation signal; and
   emit the backscatter signal.

18. The backscattering RFID system of claim 8, wherein the combined oscillator and reflection amplifier circuit further comprises a resonance circuit in electrical communication with the cathode of the first tunnel diode.

19. The backscattering RFID system of claim 18, wherein the resonance circuit comprises an inductor and a capacitor.

20. The backscattering RFID system of claim 8, wherein the combined oscillator and reflection amplifier circuit further comprises:
   a matching circuit; and
   a first RF isolator arranged in parallel communication with the anode of the first tunnel diode;
   wherein the matching circuit is arranged in series with the antenna; and
   wherein the first RF isolator is arranged in series with the biasing circuit.

21. The backscattering RFID system claim 20, wherein the matching circuit is a short shunt stub; and
   wherein the first RF isolator is a radial stub.

22. A backscattering RFID system comprising:
   an oscillator circuit comprising a first tunnel diode having a first anode and a first cathode;
   a reflection amplifier circuit comprising a second tunnel diode having a second anode and a second cathode; and
   a biasing circuit in communication with at least one the first anode and the second anode and configured to bias the first tunnel diode in a negative differential resistance region.

23. The backscattering RFID system of claim 22 further comprising an antenna configured to:
   receive an RF interrogation signal; and
   emit a backscatter signal.

24. The backscattering RFID system of claim 22, wherein the biasing circuit comprises a biasing source.

25. The backscattering RFID system of claim 24, wherein the biasing source is a power harvesting circuit.

26. The backscattering RFID system of claim 25, wherein the power harvesting circuit comprises a third tunnel diode having a third anode and a third cathode; and
   wherein the third tunnel diode is arranged in a shunt configuration with the third anode in communication with a voltage divider.

27. The backscattering RFID system of claim 26, wherein the power harvesting circuit further comprises a matching network in communication with the third anode.

* * * * *